(No Model.)

F. A. SJÖGREN.
HORSE POWER.

No. 539,552. Patented May 21, 1895.

Witnesses:

Inventor
Frans August Sjögren
By
Attorneys.

UNITED STATES PATENT OFFICE.

FRANS AUGUST SJÖGREN, OF EDESTAD, SWEDEN.

HORSE-POWER.

SPECIFICATION forming part of Letters Patent No. 539,552, dated May 21, 1895.

Application filed November 22, 1894. Serial No. 529,620. (No model.) Patented in Sweden January 2, 1893, No. 4,454.

*To all whom it may concern:*

Be it known that I, FRANS AUGUST SJÖGREN, teacher, a subject of the King of Sweden and Norway, residing in Edestad, Sweden, have invented certain new and useful Improvements in Horse-Powers, (for which Letters Patent were granted to me in Sweden, No. 4,454, dated January 2, 1893,) of which the following is a specification.

This invention has reference to an improved horse-power, in which the pulling of the power by the horse is either entirely or partly done away with, and in place thereof the weight of the animal is used for operating the power. This is accomplished by permitting the animal to act by its weight on an inclined and centrally-pivoted annular platform and as the platform is supported out of its center of gravity, it is pressed gradually downward around its pivotal support as the animal travels upon the same so that it assumes a continuous circular wave motion, which motion is employed for the driving of gear-wheels, by means of an axial crank-rod which is supported at its lower end on a step-bearing in such a manner that a line drawn from the central step-bearing to the free end of the crank-rod describes the surface of a cone, which has its apex in the center of the platform, while the latter makes a full rotation.

Figure 1:
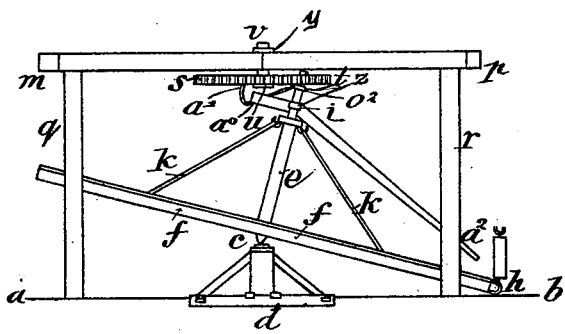
Figure 3:
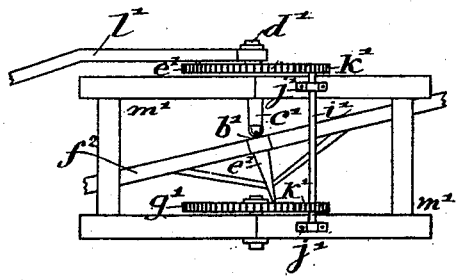
Figure 2:
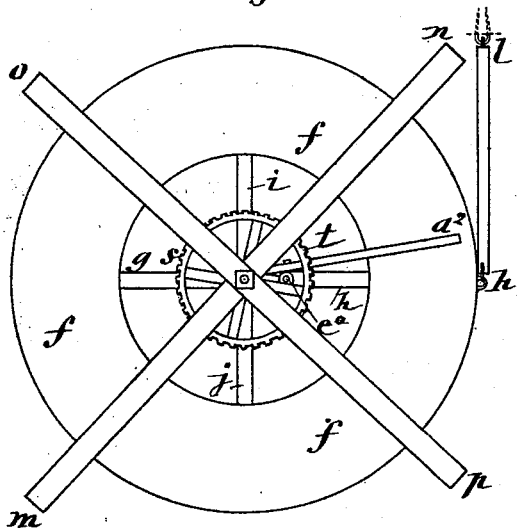
Figure 4:
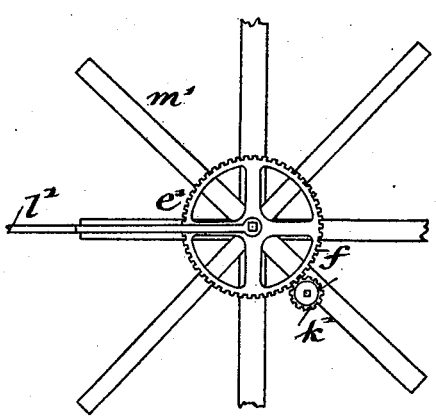

In the accompanying drawings, Figure 1 represents a side elevation of one form of my improved horse-power. Fig. 2 is a plan view of the same, and Figs. 3 and 4 are respectively a side elevation and a plan of a modified construction of horse-power in which the crank-rod is supported in downward direction.

Similar letters of reference indicate corresponding parts.

Referring to the drawings, $a$—$b$, Fig. 1 represent the line of the ground on which my improved horse-power is arranged. $c$—$d$ represent a strong center-post, which is driven into the ground. At the upper end of the post $c$—$d$ a semi-circular or cup-shaped depression is provided forming a step-bearing, in which the lower pointed end of the crank-rod $e$ is stepped. The central crank-rod $e$ is arranged perpendicularly to the platform $f$, which is arranged preferably in the shape of a ring, and is supported on inter-crossing beams $g$—$h$ and $i$—$j$, Figs. 1 and 2. Inclined braces $k$ connect the upper portion of the crank-rod $e$ with the inter-crossing beams $g$—$h$ and $i$—$j$, so as to increase the stiffness of the structure and hence strengthen the annular platform.

A stay-beam $h$—$l$, Fig. 2, is pivotally connected with the outer end of the beam $g$—$h$ and similarly connected with a stationary staple $l$ that is driven into a wall, pillar, or other support, said stay-beam preventing the turning of the platform without, however, preventing the same from being alternately raised and lowered, as the animal travels around it. Above the platform is arranged a stationary frame, composed of centrally crossing beams $m$—$n$ and $o$—$p$, Figs 1 and 2, which are at their ends supported on four uprights $q$—$r$ only two of which can be seen in Fig. 1. At the center of the frame $m$—$n$, $o$—$p$, is supported a crown-wheel $s$—$t$, which revolves horizontally on its axis $u$—$v$, attached to the frame by means of a screw-nut $y$, a second nut $x$ holding the crown wheel on the axis. The upper end of the crank-rod $e^0$ is pivotally connected with one of the spokes of the crown-wheel $s$—$t$.

On the upper end of the crank-rod $e$ is arranged a loose sleeve $z$, which is adapted to turn on the same and which forms part of the draft-beam $a^0$, $a^2$. From the upper end of the draft-beam $a^0$, $a^2$ extends a chain $a'$ to the axis $u$—$v$, and a second chain to the crank-rod at $o^2$. The sleeve $z$ is prevented from being shifted in upward or downward direction on the crank-rod, by reducing the thickness of the crank-rod, so that the sleeve can take into the reduced portion of the same, or in any other suitable manner. The chains $a'$ $o^2$ prevent the raising of the lower end of the draft-beam. The second chain $a'$ renders it possible for the lower end $a^2$ of the draft-beam to be moved somewhat in backward direction without influencing the rotation of the crown-wheel $s$—$t$. The rotary motion given to the crown-wheel $s$—$t$ is by means of its teeth communicated to any system of gearing or other power-transmitting devices.

In Figs. 3 and 4, the crank-rod $e^2$ is pivotally supported from above at $b'$ on the axis $c'$, $d'$ of the gear-wheel $e'$, $f'$. The platform $f^2$ is arranged in this case at the upper end of the crank-rod. Below the same is arranged a second gear-wheel $g'$ $h'$, the axis of which is located in the vertical line passing through the axis of the upper gear-wheel $e'\ f'$, the axis of the two wheels being attached to the stationary frame $m'$. On the shaft $i'$, which turns in the bearings $j'$ fixed to the frame $m'$, are arranged two pinions $k'$, of which one meshes with the upper and the other with the lower gear-wheel. The latter can be connected with the transmitting-wheels by which the motion is transmitted. Above the gear-wheel $e'\ f'$ is arranged the draft-beam $l'$ which extends from the axis $c'\ d'$ of the same.

When sufficient weight, be it that of the draft animal with the driver, or of the animal and a small loaded wagon back of the same, is moved around the inclined platform, the different parts of the same will be successively depressed according as the weight acting thereon passes over it, while the crank-rod moves at its eccentric end so as to describe a circle and set the gear-wheels in motion in the same direction in which the weight is moving over the platform. If the weight of the animal is not sufficient to accomplish it, the turning of the gear-wheels is accomplished by draft-chains, which are applied to the lower end of the draft-beam. As this latter is arranged in low position relatively to the platform, the force of the animal in downward direction is considerably augmented by the draft exerted on the draft-beam. The result is that an effective horse-power is obtained by the wave line imparted to the inclined platform by the draft and the weight of the horse employed for operating the power, and that thereby a very effective horse-power is obtained, which utilizes the weight of the horse in connection with the draft of the same.

Having thus described my invention, I claim as new and desire to secure by Letters Patent—

1. In a horse-power, the combination of an inclined platform, a central crank-rod arranged at right angles to the platform, means for supporting the platform and the crank-rod in inclined position, a toothed wheel connected eccentrically with the crank-rod, means for supporting the axis of the toothed wheel, in line with the support for the crank-rod and means for preventing the turning of the platform whereby the weight of the animal as it travels around the platform is adapted to impart a wave-like motion to the same, substantially as set forth.

2. In a horse-power, the combination of a platform, a crank-rod supported axially on the same, a step-bearing, the same supporting the lower end of the crank-rod, a stationary frame, a toothed wheel supported by its axis on said frame, said axis being in line with the step-bearing and the upper end of the crank-rod being eccentrically connected with the toothed wheel, whereby the platform and the crank-rod are supported in inclined position and means for preventing the turning of the platform, substantially as set forth.

3. In a horse-power, the combination of a platform, a crank-rod extending axially from the same, means for supporting the lower end of the crank-rod, a toothed wheel with which the upper end of the crank-rod is eccentrically connected, whereby the platform and crank-rod are supported in inclined position means for supporting the axis of the toothed wheel, in line with the support for the crank-rod and a draft beam applied to the axis of the toothed wheel and to the crank-rod, substantially as set forth.

4. In a horse-power, the combination of a platform, a crank-rod extending at right angles to the center of the same, means for supporting the crank-rod at its lower end, a stationary frame, extending around the platform and the crank-rod a toothed wheel supported by its axis on said frame, and connected eccentrically with the upper end of the crank-rod, whereby the platform and crank-rod are supported in inclined position and a draft-beam connected with the upper end of the crank-rod, substantially as set forth.

In testimony that I claim the foregoing as my invention I have signed my name in presence of two subscribing witnesses.

FRANS AUGUST SJÖGREN.

Witnesses:
L. HOFMAN BARY,
FR. TINLIER.